12) United States Patent
Balakrishnan et al.

(10) Patent No.: US 6,182,038 B1
(45) Date of Patent: Jan. 30, 2001

(54) CONTEXT DEPENDENT PHONEME NETWORKS FOR ENCODING SPEECH INFORMATION

(75) Inventors: Sreeram Balakrishnan, San Francisco; Stephen Austin, San Mateo, both of CA (US)

(73) Assignee: Motorola, Inc., Schaumburg, IL (US)

(*) Notice: Under 35 U.S.C. 154(b), the term of this patent shall be extended for 0 days.

(21) Appl. No.: 08/980,954

(22) Filed: Dec. 1, 1997

(51) Int. Cl.[7] ............ G10L 15/00; G10L 15/06; G10L 15/22

(52) U.S. Cl. .......... 704/250; 704/254; 704/256; 704/275

(58) Field of Search ............ 704/231, 232, 704/233, 244, 246, 251, 254, 255, 256, 257, 270, 275, 250; 379/88.01, 88.04

(56) References Cited

U.S. PATENT DOCUMENTS

| | | | |
|---|---|---|---|
| 5,293,584 | * 3/1994 | Brown et al. | 704/257 |
| 5,475,792 | * 12/1995 | Stanford et al. | 704/233 |
| 5,515,475 | * 5/1996 | Gupta et al. | 704/254 |
| 5,535,120 | 7/1996 | Chong et al. | 704/3 |
| 5,555,344 | * 9/1996 | Zunkler | 704/255 |
| 5,615,296 | * 3/1997 | Stanford et al. | 704/271 |
| 5,621,859 | * 4/1997 | Schwartz et al. | 704/256 |
| 5,651,096 | 7/1997 | Pallakoff et al. | 704/275 |
| 5,715,367 | * 2/1998 | Gillick et al. | 704/254 |
| 5,745,649 | * 4/1998 | Lubensky | 704/254 |
| 5,805,710 | 9/1998 | Higgins et al. | 382/101 |
| 5,867,817 | * 2/1999 | Catallo et al. | 704/255 |
| 5,915,001 | * 6/1999 | Uppaluru | 379/88.12 |
| 5,960,399 | * 9/1999 | Barclay et al. | 704/270 |

FOREIGN PATENT DOCUMENTS

| | | |
|---|---|---|
| 2230370 | 10/1990 | (GB). |
| 224023 | 7/1991 | (GB). |
| WO 98/08215 | 2/1998 | (WO). |

OTHER PUBLICATIONS

"Specialized Language Models for Speech Recognition", IBM Technical Disclosure Bulletin, vol. 38, No. 2, Feb. 1995, pp. 155–157, XP000502428.

S.J. Young, M.G. Brown, J.T. Foote, G.J.F. Jones and K. Sparck Jones. Acoustic Indexing For Multimedia Retrieval and Browsing. In Proc. ICASSP 97, pp. 1–4, Munich, Germany, Ap. 1997. IEEE.

* cited by examiner

Primary Examiner—David R.. Hudspeth
Assistant Examiner—Martin Lerner
(74) Attorney, Agent, or Firm—Terri S. Hughes; Hugh C. Dunlop; Romi N. Bose

(57) ABSTRACT

A method and apparatus for generating a context dependent phoneme network as an intermediate step of encoding speech information. The context dependent phoneme network is generated from speech in a phoneme network generator (48) associated with an operating system (44). The context dependent phoneme network is then transmitted to a first application (52).

5 Claims, 4 Drawing Sheets

```
NODE 1a, TIME=0, ARCS=2
      TH-12.1, TO 2a
      TH-12.5, TO 2b
NODE 1b, TIME=0, ARCS=2
      DH-13.1, TO 2c
      DH-13.5, TO 2d
NODE 2a, TIME=10, ARCS=2
      AH-9.8, TO 3a
      AH-9.6, TO 3b
NODE 2b, TIME=10, ARCS=2
      IH-12.3, TO 3c
      IH-12.6, TO 3d

...etc...
```

CONTEXT DEPENDENT PHONEME NETWORKS FOR ENCODING SPEECH INFORMATION

FIELD OF THE INVENTION

The present invention relates generally to computer speech recognition.

BACKGROUND OF THE INVENTION

Recent advances in computer hardware and software have allowed computer speech recognition (CSR) to cross the threshold of usability. Systems are now available for high end personal computers that can be used for large vocabulary, continuous speech dictation. To obtain adequate performance, such systems need to be adapted to a specific user's voice and environment of usage. In addition, these systems can only recognize words drawn from a certain vocabulary and are usually tied to a particular language model, which captures the relative probabilities of different sequences of words. Without all of these constraints, it is very difficult to get adequate performance from a CSR system.

In most CSR systems, the user and environment specific part, or acoustic models, are usually separate to the vocabulary and language models. However, because of the above constraints, any application that requires speech recognition needs access to both the user/environment specific acoustic models and the application specific vocabulary and language models.

This is a major obstacle to moving CSR systems beyond standalone dictation, to systems where many different users will need to access different applications, possibly in parallel and often over the internet or a local area network (LAN). The reason is that either: (a) each application will have to keep separate acoustic models for each user/environment; or (b) each user will need to maintain separate sets of vocabularies and language models for each application they wish to use. Since the size of acoustic and language models are typically in the order of megabytes to tens of megabytes for a medium to large vocabulary application, it follows that in either scenario (a) or (b), the systems' resources are going to be easily overwhelmed.

One possibility is to store the acoustic models on a different machine to the vocabulary and language models, and connect the machines via a LAN or the internet. However, in either (a) or (b), enormous amounts of network traffic will be generated as megabytes of data are shifted to the target recognizer.

Thus, a need exists for a CSR system that is independent of the vocabulary and language models of an application without sacrificing performance in terms of final recognition accuracy.

BRIEF DESCRIPTION OF THE DRAWINGS

A preferred embodiment of the invention is now described, by way of example only, with reference to the accompanying drawings in which.

DETAILED DESCRIPTION OF THE DRAWINGS

Context dependent phoneme networks (CD phoneme networks) are proposed as a solution to the above problems of the state-of-the-art. A method and apparatus for generating a CD phoneme network as an intermediate step of encoding speech information is described herein. CD phoneme networks arise from splitting speech recognition into two parts: a client that is user and environment specific, that continually listens and encodes the user's speech as a CD phoneme network, and a set of applications that can use these CD phoneme networks together with an application specific vocabulary and language models to perform final recognition.

CD phoneme networks provide a way for encoding the output from the client that is independent of vocabulary and language models of a first (i.e., target) application: thus any application which can use these CD phoneme networks does not need access to the user/environment specific acoustic models that are used to originally generate the CD phoneme networks.

Importantly, unlike simple phoneme networks, CD phoneme networks encode the speech information in a way that does not sacrifice any performance in terms of final recognition accuracy, and may even enhance the performance.

With respect to the architecture proposed herein, the aspects of recognition which require knowledge of the user and environment take place at the site of the user. This has the advantage, from the user's perspective, of leveraging his adaptation investment to any application. From an application developer's point of view, it removes the headache of having to maintain user specific models, which could prove very attractive for internet service providers with many thousands of users. Furthermore, the aspects of recognition which require access to large language models and vocabularies and, as a consequence, large amounts of disk space, can take place at a centralized application. Thus, improvements in the language models and vocabularies of the centralized application are automatically available to all users without the need to download huge data files.

Figures 1, 3:
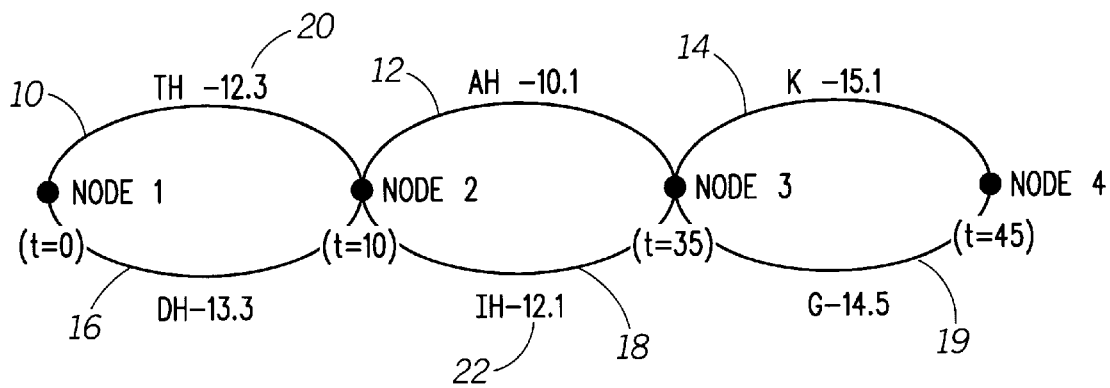
FIG. 1 illustrates a simple phoneme network.
FIG. 3 illustrates an encoding for the tri-phone network of FIG. 2 according to the preferred embodiment of the present invention.

Before describing CD phoneme networks in detail, it is useful to describe simple phoneme networks as an intermediate stage for speech recognition. As shown in FIG. 1, a phoneme network consists of a set of nodes 1, 2, 3 and 4 and arcs 10, 12, 14, 16, 18 and 19. The nodes 1, 2, 3 and 4 represent possible phoneme start and end times. The arcs 10, 12, 14, 16, 18 and 19, which link a "from node" 2 with a "to node" 3, represent a particular phoneme starting and ending at the times corresponding to the "from" and "to" nodes. Associated with each arc 10, 12, 14, 16, 18 and 19 is a score 20 or likelihood of the phoneme.

A key deficiency of the simple phoneme network and the reason why it is not used as an intermediate stage in most speech recognizers is that the arc scores 20 and 22 are context independent. In other words, the score 22 on the IH arc 18 between nodes 2 (t=10) and 3 (t=35) is independent of which arc is taken to get to node 2 or which arc is taken from node 3. CD phoneme networks correct this by making the arc scores context dependent. The context of an arc can be split into a "from context" which is determined by the path taken to reach the "from node" and the "to context" which is determined by the path taken after the "to node".

In more sophisticated speech recognition networks, the "from" and "to" contexts will affect the score of the phoneme associated with a particular arc. The way the context is used will vary depending on the complexity of the system. Simple phoneme networks, where no context is used, sit at one end of the spectrum. In a tri-phone network, for example, the "from context" is the phoneme associated with the last arc taken to reach the "from node" while the "to context" is the phoneme associated with the first arc taken from the "to node". In even more complex systems, such as quin-phone networks, the "from" and "to" contexts consist of the last two and first two arcs of the paths taken to reach the "from node" and the "to node".

Figure 2:
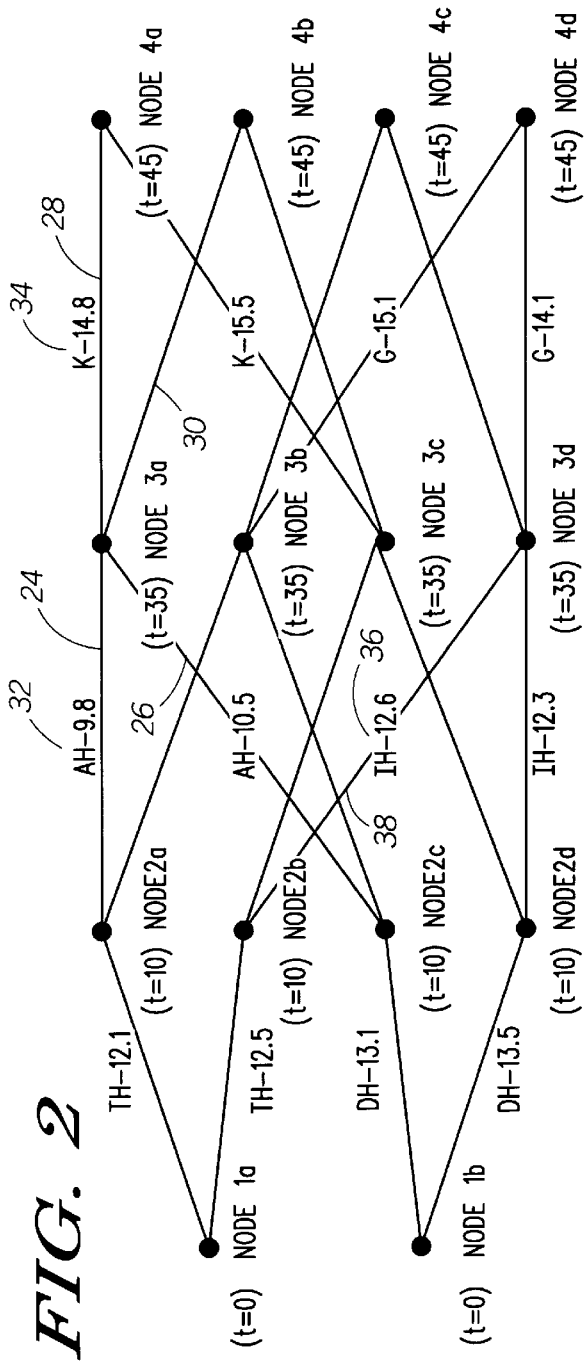
FIG. 2 illustrates a tri-phone network equivalent to FIG. 1 according to the preferred embodiment of the present invention.

In order to ensure that the "from" and "to" contexts of an arc match the "from" and "to" contexts of the scores associated with the arc, the "from" and "to" nodes of the arc may need to be split. FIG. 2 is an illustration of this split for the specific case of a tri-phone equivalent to the simple phoneme network shown in FIG. 1. In the case of FIG. 2, the nodes have been split so that both the arcs 24 and 26 going into any node (e.g., node 3a) have the same phoneme label (e.g., AH), and the arcs 28 and 30 coming from any node (e.g., node 3a) have the same phoneme label (e.g., K). The arc scores 32 and 34 can now represent tri-phones scores, since the "from" and "to" phoneme contexts will be uniquely specified. For example, the score 36 on the arc 38 linking node 2b to node 3d represents the tri-phone score of IH with a left context of TH and a right context of G.

FIG. 3 illustrates an encoding for the tri-phone network shown in FIG. 2. FIG. 3 consists of a list of nodes associated with times. For each node, there is a sublist of arcs consisting of all the arcs originating at that particular node. Associated with each arc is a phoneme label, a tri-phone score and a "to node". Because the tri-phone networks have tri-phone scores attached to each arc, they can serve as input to any cross word speech recognizer. A phoneme network generator can then search the tri-phone network for the path that gives the best score given a particular vocabulary and language model. The phoneme network generator does not need to have any user or environment specific acoustic models or even access to the original speech. All the information required to decode the words in a speech signal is captured in the tri-phone network itself.

Figure 4:
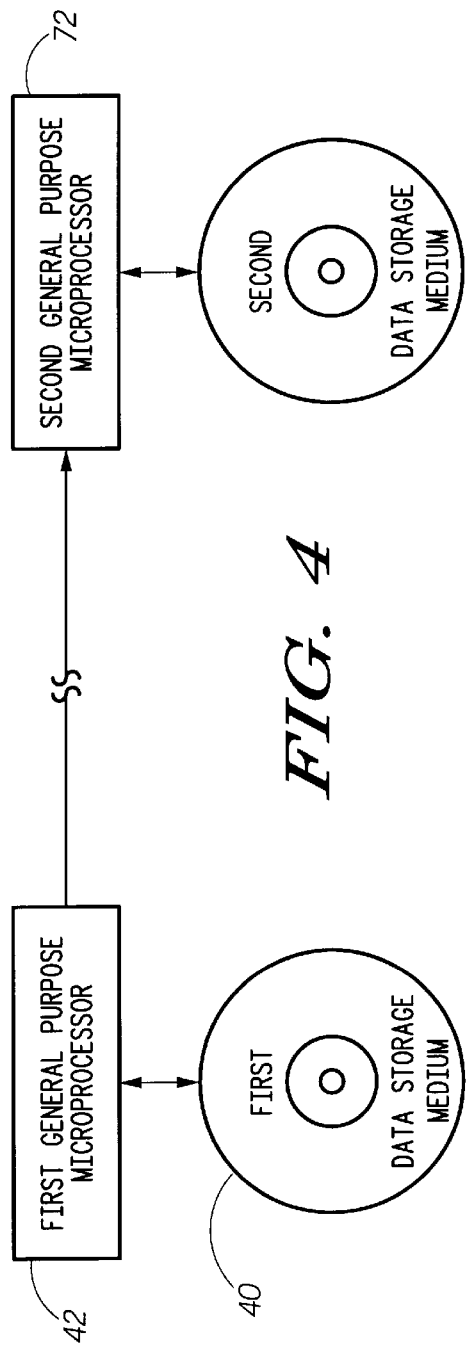
FIG. 4 is a general block diagram of an overall system according to the preferred embodiment of the present invention.
Figure 5:
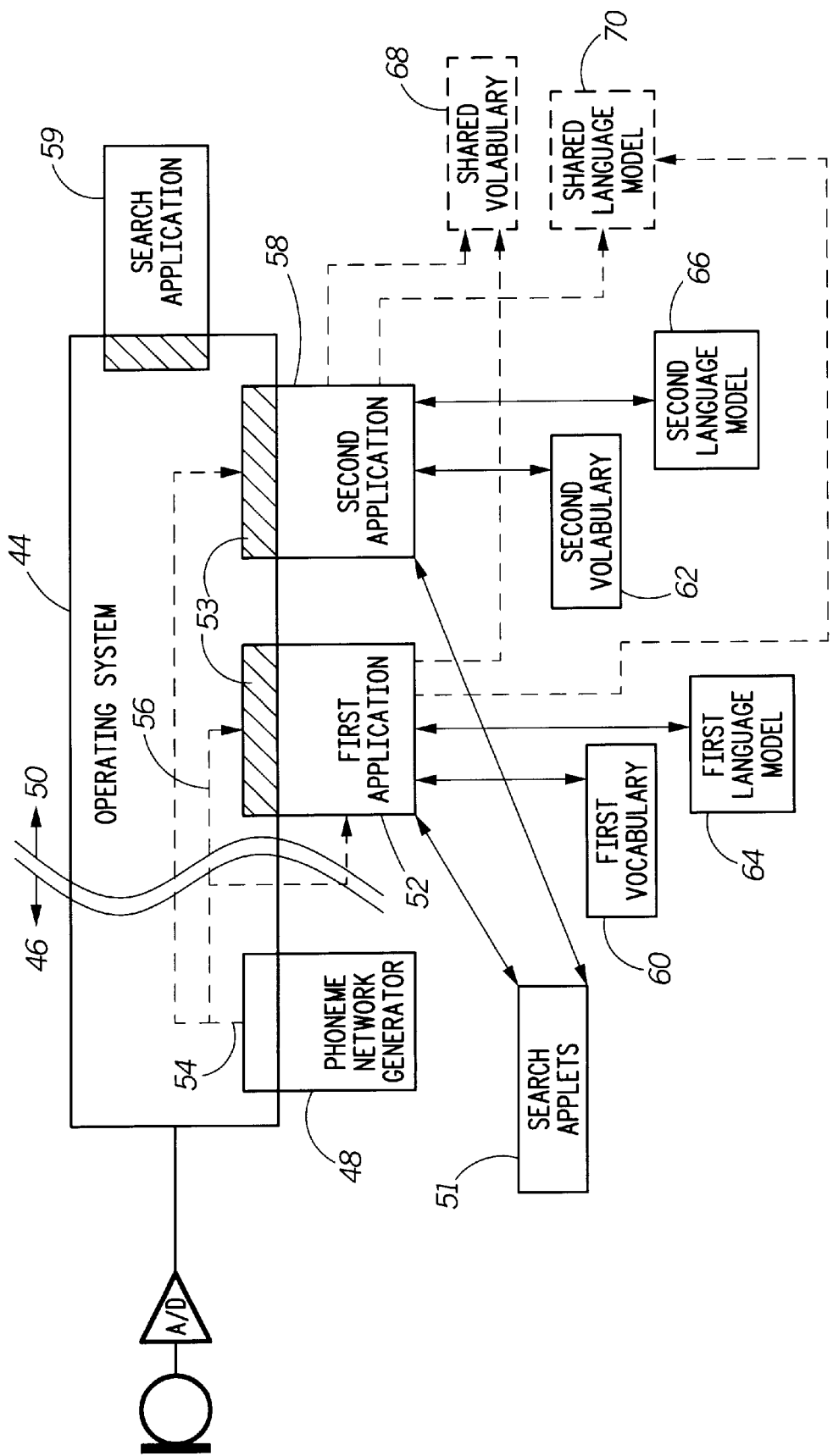
FIG. 5 is a detailed block diagram of the overall system according to the preferred embodiment of the present invention.

Referring to FIGS. 4 and 5, in accordance with the preferred embodiment of the present invention, a data storage medium 40 is described herein having stored thereon instructions and data which, when loaded into at least a first general purpose microprocessor 42 having an operating system 44, cause at least the first general purpose microprocessor 42 to perform a method for generating a CD phoneme network as an intermediate step of encoding speech information. Preferably, the first general purpose microprocessor 42 comprises a first part 46 of the operating system 44 having a phoneme network generator 48 (preferably a CD phoneme network generator) and a second part 50 of the operating system 44 having at least a first application 52.

The phoneme network generator 48 and the first application 52 are independently associated with the operating system. The phoneme network generator 48 can be a separate application (separate from the operating system 44), for example implemented as a dynamic link library, in which case each application 52,58 must specifically call up the phoneme network generator 48. Alternatively, the phoneme network generator 48 can be a part of the operating system 44, and accessible by the operating system's application programming interface 53. The first and second parts 46 and 50, respectively, of the operating system 44 may form a unitary operating system on a single general purpose microprocessor or other computer. Alternatively, the second part 50 of the operating system 44 can be stored on a second general purpose microprocessor 72, separate from the first part 46 and the first general purpose microprocessor 42.

When the second part 50 of the operating system 44 has at least a first and a second application 52 and 58, respectively, each of the two applications 52 and 58, respectively, can have different vocabularies 60 and 62, respectively, and different language models 64 and 66, respectively. Alternatively, the first and the second applications 52 and 58, respectively, can share a common vocabulary 68 and a common language model 70.

The phoneme network generator 48 and the first application 52 may be remotely located from each other and connected by a link 56, either a wireless link or a network link (i.e., the first part 46 of the operating system 44 may be remotely located from the second part 50 of the operating system 44). In operation, the phoneme network generator 48 generates a CD phoneme network having an output 54 defining the CD phoneme network. The output 54 of the phoneme network generator 48 is in a format capable of being stored for later input to the first application 52. The first application 52 is adapted to receive the output 54 of the phoneme network generator 48.

Figure 6:
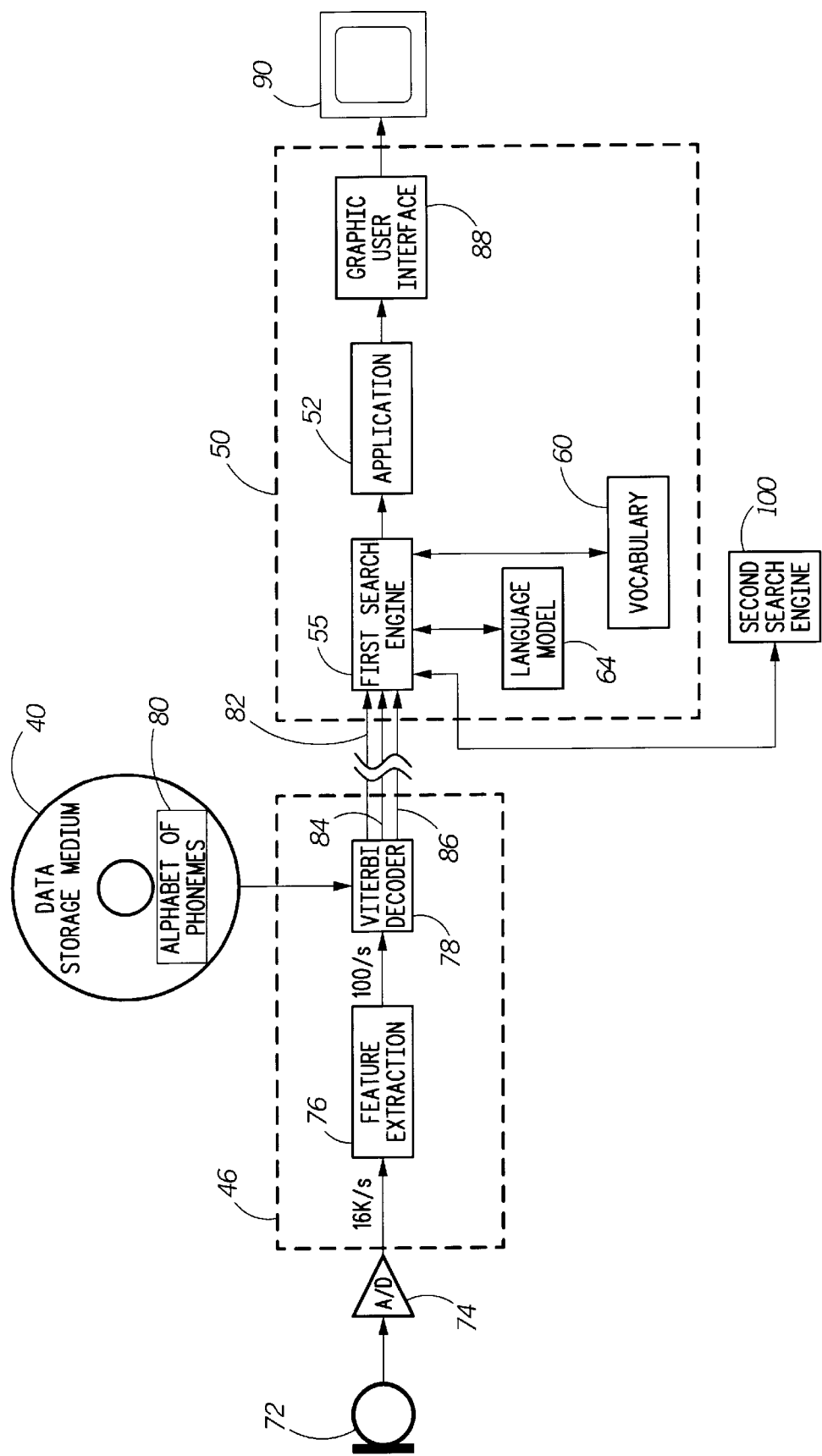
FIG. 6 is a detailed block diagram of FIG. 5 according to the preferred embodiment of the present invention.

Referring to FIG. 6, the phoneme network generator 48 is shown in detail, comprising a microphone 72 connected to an analog-to-digital converter 74 connected in turn to an input of the first part 46 of the operating system 44. The data storage medium 40 having an alphabet of phonemes 80 is also connected to an input of the first part 46 of the operating system 44.

The first part 46 of the operating system 44 is dependent on user and environment specific acoustic models. The first part 46 of the operating system 44 comprises a number of elements formed in software. These include a feature extraction element 76 having an input and an output, and a Viterbi decoder 78 having and input connected to the output of the feature extraction element 76 and having an input connected to the data storage medium 40. Alternatively, element 78 (the Viterbi decoder) may be a Baum-Welsh based decoder or elements 60 and 62 (the feature extraction and the Viterbi decoder, respectively) may be combined and replaced by a neural-network based decoder.

The second part 50 of the operating system 44 is dependent on a first application selectable independently from the first part 46 of the operating system 44. The second part 50 of the operating system 44 encompasses a first search engine 55, having inputs coupled to the outputs 82, 84 and 86 of the Viterbi decoder 78. The outputs 82, 84 and 86 of the Viterbi decoder 78 are a phoneme label, a score and a "from" node—"to" node pair, respectively, which define the arcs of the CD phoneme network. The first search engine 55 is coupled to a vocabulary 60 and a language model 64. The first application 52 is coupled to the first search engine 55, and a graphic user interface 88 in the form of a computer program is coupled to the first application 52. The graphic user interface has inputs connected to the output of the first application 52 and has an output coupled to a display 90.

In operation, the first part 46 of the operating system 44 generates a CD phoneme network in order to capture user and environment specific acoustic models. Thus, the first part 46 of the operating system 44 converts raw speech to a CD phoneme network with the aid of user and environment specific acoustic models and phoneme language models which are continuously adapting to the user's voice, environment and use of language. The models could be running on a personal computer, a cellular telephone, pager or any other appropriately configured piece of hardware. The first part 46 of the operating system 44 extracts from a speech signal the desired information required for speech recognition, packages the desired information in a vocabulary, language model, user and environment independent format and transmits the desired information to the second part 50 of the operating system 44.

The second part 50 of the operating system 44 then uses appropriate search engine applets 51 to extract from the CD phoneme network information relevant to the needs of the first application 52, using the vocabulary 60 and the language model 64 of the first search engine 55 in order to retrieve a candidate recognition result and deliver the candidate recognition result to the first application 52. Either the CD networks are sent to the application (52 or 58) and the search applet 51 is loaded within the application to perform a search of the phoneme network, or the search applet 51 is part of the operating system 44 (or is a separate application 59) and the language model 64 and vocabulary 60 are sent from the application 52 to the search applet 51 (or the search application 59). In the latter case, the CD phoneme network is sent to the search applet or the search application 59 and the results are forwarded from the operating system to the application 52 or 58.

Preferably, after attempting recognition in the first search engine 55, and upon unsatisfactory recognition in the first search engine, the CD phoneme network is forwarded to a second search engine 100 (e.g., a more powerful search engine). The second search engine 100 subsequently retrieves a candidate recognition result and delivers the candidate recognition result to the first application 52. The implementation of passing the CD phoneme network from a first search engine to a second search engine to achieve a greater confidence level of accuracy can be extended to any number of search engines. For example, the second part 50 of the operating system 44 can be set up to pass the CD phoneme network to a subsequent search engine if the confidence level of a current search engine does not exceed a predefined threshold. Passing the CD phoneme network from one search engine to another will continue to occur until a search engine can produce a candidate recognition result that exceeds the predefined threshold with respect to the confidence level of accuracy. Alternatively, the second part 50 of the operating system 44 can send the CD phoneme network to at least two search engines simultaneously. The confidence levels of accuracy of the at least two search engines are compared and the search engine with the highest confidence level of accuracy is selected to operate the first application 52.

By combining appropriate vocabularies and language models with the relevant search engine applets, a developer will be able to rapidly speech enable his applications. Many languages could act as the glue for combining applets together, including visual basic and hypertext markup language (HTML).

This approach, in accordance with the preferred embodiment of the present invention, can be extended to networks with either more or less context than tri-phone networks. All that will change is the degree of node splitting required to ensure the correct "from" and "to" contexts for each arc. The phoneme network generator 48 itself does not need to be aware of the exact nature of the context used to determine each arc score, since the network itself will enforce the constraint that the paths leading "from" and "to" an arc have the context appropriate for the arc score.

While the invention has been described in conjunction with a specific embodiment thereof, additional advantages and modifications will readily occur to those skilled in the art. The invention, in its broader aspects, is therefore not limited to the specific details, representative apparatus and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method for encoding speech information comprising:

generating at a local user location, as an intermediate step in speech recognition, a context dependent phoneme network from speech in a phoneme network generator using an acoustic model that adapts to a user's voice, wherein the context dependent phoneme network is a representation of speech input in the form of nodes and arcs, each arc representing a score of a phoneme with start and end times represented by nodes, the phoneme network enabling the speech input to be represented by the nodes and arcs thereby resulting in the speech input being packaged into an intermediate format that is independent of vocabulary, language model, user and physical environment; and transmitting the context dependent phoneme network to one or more application programs located remotely from the local user, to enable the remote application programs to effect recognition of speech in each application program using a vocabulary and language model selected by the application program, thereby obviating the need for the local user location to perform recognition of speech tasks.

2. The method according to claim 1 further comprising extracting, at a first application, information needed from the context dependent phoneme network using vocabulary and language models of the first application in order to operate the first application.

3. A data storage medium comprising instructions and data which, when loaded into a first general purpose microprocessor having an operating system cause the first general purpose microprocessor to comprise:

a phoneme network generator located at a local user location generating a context dependent phoneme network having an output defining the context dependent phoneme network, wherein the context dependent phoneme network enables the speech input to be represented in the form of nodes and arcs, where each arc represents a score of a phoneme with start and end times represented by nodes, thereby resulting in the speech input being packaged in an intermediate format; and a plurality of application programs located remotely from the local user location adapted to receive the output of the phoneme network generator and extract information needed from the output using vocabulary and language models of the plurality of application programs thereby eliminating information from being extracted at the local user location, the phoneme network generator and the plurality of application programs being independently associated with the operating system.

4. The data storage medium according to claim 3 wherein the data storage medium comprises a first part having stored thereon the phoneme network generator and a second part having stored thereon the plurality of applications.

5. A method for encoding speech information comprising:

generating at a local user location a context dependent phoneme network from speech in a phoneme network generator associated with an operating system, wherein the context dependent phoneme network is a representation of speech input in the form of nodes and arcs, where each arc represents a score of a phoneme with start and end times represented by nodes, thereby packaging the speech input in an intermediate format;

transmitting the context dependent phoneme network to a plurality of applications located remotely from the local user location via the operating system; and extracting, at the remotely located plurality of applications, information needed from the context dependent phoneme network using vocabulary and language models of the plurality of applications in order to operate the plurality of applications.

* * * * *